(12) United States Patent
Menzel

(10) Patent No.: US 7,604,684 B2
(45) Date of Patent: Oct. 20, 2009

(54) METHOD FOR SELECTIVE REMOVAL OF HYDROGEN SULPHIDE AND $CO_2$ FROM CRUDE GAS

(75) Inventor: Johannes Menzel, Waltrop (DE)

(73) Assignee: Uhde GmbH, Dortmund (DE)

( * ) Notice: Subject to any disclaimer, the term of this patent is extended or adjusted under 35 U.S.C. 154(b) by 658 days.

(21) Appl. No.: 10/550,251

(22) PCT Filed: Mar. 24, 2004

(86) PCT No.: PCT/EP2004/003085

§ 371 (c)(1),
(2), (4) Date: Sep. 23, 2005

(87) PCT Pub. No.: WO2004/085036

PCT Pub. Date: Oct. 7, 2004

(65) Prior Publication Data

US 2006/0196357 A1 Sep. 7, 2006

(30) Foreign Application Priority Data

Mar. 26, 2003 (DE) ................................. 103 13 438

(51) Int. Cl.
*B01D 53/14* (2006.01)
(52) U.S. Cl. .............................. 95/173; 95/174; 95/181; 95/183; 95/199; 95/235; 95/236
(58) Field of Classification Search .......... 95/235–236, 95/173, 174, 181, 183, 199; 423/220, 226–227
See application file for complete search history.

(56) References Cited

U.S. PATENT DOCUMENTS 3,594,985 A * 7/1971 Ameen et al. .................. 95/163

(Continued)

FOREIGN PATENT DOCUMENTS

DE 32 22 282 C2 12/1982

(Continued)

OTHER PUBLICATIONS

"Acid and Sour Gas Treating Processes", Gulf Publishing Company, ISBN 0-87201-839-3, p. 21, fig. 6.

(Continued)

*Primary Examiner*—Duane Smith
*Assistant Examiner*—Ives Wu
(74) *Attorney, Agent, or Firm*—Collard & Roe, P.C.

(57) ABSTRACT

With the help of a method of selective removal of hydrogen sulphides, organic sulphur components and $CO_2$ from crude gases, by using a first and second absorption stage (41 or 49) for separating almost pure $CO_2$, a solution has to be found, with which, among other things, hydrogen sulphides and organic sulphur compounds can be removed in as selective a manner as possible.

Figure 1:
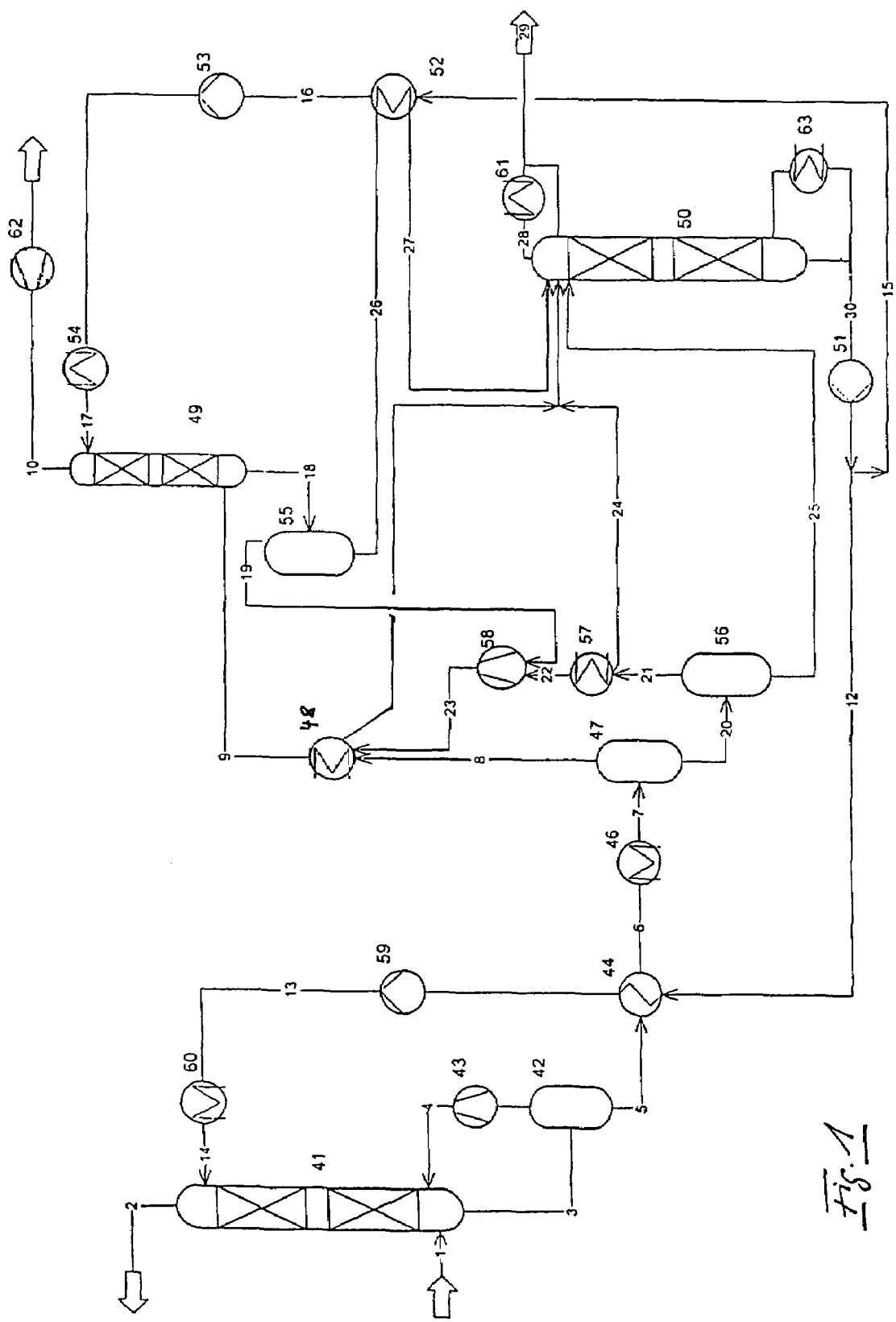

This is achieved as follows: the absorption agent coming out of the first absorption stage (41) and enriched with hydrogen sulphide and $CO_2$ a.o., is pre-heated to an increased pressure with the hot-regenerated solution (12) coming from the desorption stage (50) in a heat exchanger (44), and then at the selected higher pressure de-stressed in a high pressure flash container (47), whereby the gas flow released at the increased pressure is cooled in a condenser (48) and then guided to the second absorption stage (49), in which the sulphur components are completely removed with the help of a part-flow of the regenerated absorption agent (15, 16, 17) coming from the desorption stage (50), whereby the absorption agent is guided back (26/27) from the second absorption stage (49) into the desorption stage (50).

6 Claims, 2 Drawing Sheets

U.S. PATENT DOCUMENTS

| | | | |
|---|---|---|---|
| 3,877,893 A * | 4/1975 | Sweny et al. | 95/162 |
| 4,112,051 A | 9/1978 | Sartori et al. | |
| 4,242,108 A | 12/1980 | Hegarty | |
| 4,498,911 A | 2/1985 | Deal et al. | |
| 4,997,630 A * | 3/1991 | Wagner et al. | 423/228 |
| 5,137,550 A | 8/1992 | Hegarty | |
| 5,240,476 A | 8/1993 | Hegarty | |
| 5,820,837 A * | 10/1998 | Marjanovich et al. | 423/220 |
| 6,277,345 B1 | 8/2001 | Stankowiak et al. | |
| 6,342,091 B1 | 1/2002 | Menzel et al. | |
| 6,506,349 B1 * | 1/2003 | Khanmamedov | 423/210 |
| 7,147,691 B2 * | 12/2006 | Palmer | 95/186 |

FOREIGN PATENT DOCUMENTS

| | | |
|---|---|---|
| DE | 32 22 82 C2 | 12/1982 |
| DE | 198 54 353 A1 | 6/2000 |
| DE | 199 45 326 A1 | 8/2000 |
| EP | 0 033 029 A1 | 8/1981 |
| EP | 0 520 316 A1 | 12/1992 |
| EP | 1 004 344 | 5/2000 |

OTHER PUBLICATIONS

"Acid and Sour Gas Treating Processes", Gulf Publishing Company, ISBN 0-87201-839-3, p. 21, fig. 6. to follow (spec).

* cited by examiner

METHOD FOR SELECTIVE REMOVAL OF HYDROGEN SULPHIDE AND CO$_2$ FROM CRUDE GAS

CROSS REFERENCE TO RELATED APPLICATIONS

Applicant claims priority under 35 U.S.C. §119 of German Application No. 103 13 438.7 filed Mar. 26, 2003. Applicant also claims priority under 35 U.S.C. §365 of PCT/EP2004/003085 filed Mar. 24, 2004. The international application under PCT article 21(2) was not published in English.

The invention pertains to a method for selective removal of hydrogen sulphide, organic sulphuric component and CO$_2$ from crude mineral gas of the generic types as mentioned in the introductory part of claim 1, as for example described in the document DE-199 45 326-A1 or the publication "Acid and Sour Gas Treating Processes", Gulf Publishing Company, ISBN 0-87201-839-3, in the chapter "Gas Treating with a Physical Solvent", page 21, FIG. 6.

Gases containing valuable substances, like mineral gas or synthesis gas, contain, among other things, acid-forming impurities like CO$_2$, H$_2$S, COS, CS$_2$ and/or mercaptane and HCN, which have to be removed for further utilisation of the gases. Legal specifications not only make reduction of sulphur discharge compulsory, but also CO$_2$-shares, which moreover reduce the calorific values. Impurities could be in the form of damaging catalyst poisons and could cause corrosions and more. In order to remove hydrogen sulphides, one can use chemical absorption agents, like ethanol, amine, alkali-salt solutions among other things, or also use physical absorption agents, like, e.g. selexol, propylene carbonate, methanol and other substances, whereby with the help of physical absorption agents, sulphur components can be removed.

By choice and application of selective absorption application agents, one can already achieve quite a good selectivity of removal of hydrogen sulphide and organic sulphur compounds with respect to carbon dioxide. As selectively effective absorption agents, chemically effectively absorption agents like selective amines, as well as also physical absorption agents like selexol, pursiol, genosorb or morphysorb are used. This selectivity is however not adequate, if P particularly unfavourable ratio of hydrogen sulphide and organic sulphur compounds and carbon dioxide in the gas being used leads to a sour gas with such a low content of sulphur components, that the sour gas can no longer be treated in a Claus-plant The chemical absorption agents and their application are described in the document U.S. Pat. No. 4,112,051 (Sartori et. al.). In contrast to these chemically active solvent using methods, this invention is directed particularly at chemically not-active absorption agents, on the one hand, to gain CO$_2$ which is as pure as possible, as valuable substance and, on the other hand, with sour gas or gas for application in a Claus-process, and also take advantage of a quality characteristic required there. Generally the sour gas coming from the absorption agent regeneration is further processed in a Claus-plant to sulphur. Thereby the carbon dioxide contained in the sour gas works in a disadvantageous manner on the Claus-process, because carbon dioxide as ballast substance increases the process gas flow in the Claus-plant, which would make a corresponding increase in the plant capacity necessary. Moreover, a Claus-plant with a sour gas that contains less than 10% by volume of H$_2$S cannot be operated technically in a cost-effective manner.

Therefore, in order to process such a "weak" sour gas in a Claus-plant, additional measures are necessary. Generally, the concentration of sulphur components takes place, in that the sulphur components contained in the low-concentrated sour gas are removed once again with the help of a second absorption column, after eventual additional compression with regenerated absorption solution, whereby on account of the already better ratios of hydrogen sulphide and organic sulphur compounds with respect to the carbon dioxide in the sour gas from the first absorption stop, a correspondingly higher concentration of sulphur components in the sour gas of the second absorption stage is achieved. This process however requires very high energy consumption and investment costs, as the total sour gas flow from the first absorption stage has to first be brought to the required pressure.

Other possibilities of treating sour gases which have a low content of sulphur component, like sulphur extraction through direct-oxidative processes or generation of sulphuric acid etc., lead to large process gas quantity flow and hence also to huge process plants.

The patent document U.S. Pat. No. 5,240,476 (Hegarty) refers to the co-absorption in connection with combustion gas purification in a power plant working on the basis of coal gasification with combined gas and steam turbines. For regeneration of the loaded washing solution, the pressure is released to almost surrounding pressure, whereby a first portion of the CO$_2$ washed out through co-absorption gets gased out and is fed back into the crude gas. The remaining CO$_2$ is removed by stripping off the remaining, still part-loaded washing solution mainly containing nitrogen-containing gas. Thereafter, in a subsequent step, it is released to almost surrounding pressure. In a stripping column heated with the help of a sump boiler, the hydrogen sulphide remaining in it is separated from it and given as raw material to a Claus-plant.

In the method mentioned in the patent document U.S. Pat. No. 5,240,476 (Hegarty), the waste nitrogen occurring during air disintegration is used for separating the CO$_2$ from the activated washing solution. Therefore, this method is restricted in its application to the immediate field of coal gasification operated with the help of partial oxidation, and hence not suitable for purification of crude mineral gas; analogous also for synthesis gas without N$_2$. Moreover, the crude gas introduced with a lot of apparatus complication is individually treated with solution in two individual steps in absorption columns connected in series.

For the purely technological aspect, as far as patent literature is concerned, please also refer to the documents EP-0 033 029-A1 or the corresponding documents U.S. Pat. No. 4,242,108, EP-1 004 344 or the corresponding document DE-198 54 353 A1, the document EP-0 520 316 A1, the document U.S. Pat. No. 4,498,911, with a large quantity of CO$_2$ in the gas, only to mention a few examples.

Another generic method is known from the document DE 32 22 282-C2, in which the gas to be purified is first led through a first absorber and then brought in contact there with a completely regenerated solvent. The charged solvent is fed through a heater to a flash boiler and the gases released there are fed to a second absorber, where they are again brought in contact with the completely regenerated solvent. However, this way only the Claus-gas with 33% by volume of H$_2$S is achieved, as described in more details below.

It is the task of this invention to present the solution, with the help of which hydrogen sulphide and organic sulphur compounds can, on the one hand be selectively removed as far as possible, which leads to a low carbon dioxide contents in the sour gas and, on the other hand, avoids the disadvantage of high operative complexity for CO$_2$-separations.

With the help of a method of the type described above, this task as per invention is fulfilled, using the marked features ms mentioned in the main claims. With the method as per the invention, a series of advantages can be achieved, e.g. production of a Claus-gas according to the specifications, starting from the unfavourable ratios $H_2S$ to $CO_2$ in the feed gas, as wall as additional gain of almost pure $CO_2$ at increased pressure.

Further advantages and features of the invention can be obtained from the sub-claims, whereby it could be particularly advantageous, if the activated absorbing substance is heated after the second absorption stage and before entering into the desorption stage, whereby the hear is conducted in indirect heat exchange with the absorbing substance flow coming from the desorption stage.

A further improvement of the effect of the method as per the invention could be, in that after the second absorption stage, a flash stage is foreseen, in which the activated absorbing substance is de-stressed out of the second absorption stage and the thus released flash gas, which mainly contains $CO_2$ and portions of $H_2S$, is conducted into a pipeline at east leading indirectly to the second absorbing substance stage ad the absorbing substance is conducted into the desorption stage.

For further stripping of the carbon dioxide agent in the absorption agent leaving the absorption column, the absorption agent is de-stressed in to a flash container at lowered pressure. The ensuing gas phase is again fed to the second absorption column by means of a flash gas compressor. In the design as per the invention, it could be foreseen, that directly before the second absorption a stage flash stage is arranged, in which the absorbing substance coming out of the condensation stage is de-stressed and the thus released valuable gas, which mainly contains hydrocarbons, $H_2S$ and $CO_2$, is guided back into the first absorption stage.

Apart from the additional advantages of the invention given below, it would also be advantageous if the absorption takes place at an operating pressure of 10 to 150 bar and/or if a temperature increase of the absorption agent coming from the absorbing substance is undertaken, to 50 to 200° C.

If the main flow of the absorption agent leaving the high pressure flash container still contains a high quantity of carbon dioxide, then in a further design form of the invention it can be foreseen, that the absorption solution leaving the high pressure flash container gets de-stressed in a low pressure flash, whereby the flash gas is fed to the second absorption column along with the flash gas from the flash stage with the help of a common compressor, and whereby the absorption solution leaving the low pressure flash is guided on to the head of the desorption column.

Absorption agent flows of the main cycle or part-cycle, flashed at lowered pressure, are de-stressed in the desorption column, where at the sump column, by means of stripping with the help of stripping vapour or stripping gas, the almost sour gas-free, regenerated absorption agent flow takes place. In this case, as per the invention, at the head of the desorption column, a concentrated sour gas fraction with the desired high content of hydrogen sulphide and organic sulphur compound can be obtained. The sour gas flow exiting at the head of the desorption column is again cooled with the help of a condenser to recover absorption agent.

Similarly, for recovery of the absorption agent, also the flash gas of the low pressure container is cooled by a cooler, before the flash gas is led to the flash gas compressor. The almost pure carton dioxide obtained at the head of the second absorption column at increased pressure can either be used in the process again or extracted as commercial product, or be used for purposes of re-injection into mineral gas and mineral oil fields, on account of the already increased preliminary pressure. The increased pressure level can be use for energy recovery with the help of an expander machine.

In contrast to the conventional method described further above, in which the concentration of sulphur components tikes place with the help of a second absorption cycle subsequently connected, for which the sour gas containing less hydrogen sulphide and organic sulphur compound has to be brought to the required absorption pressure with the help of a compressor. The method described here as per the invention has the distinct advantage, that a large portion of the sour gas already has the high pressure level required for absorption with physical absorption agents on account of distressing at higher pressure ad increased temperature, and therefore this pet-flow need not be compressed further.

With the absorption of these flash gases in the side-flow absorption, the selectivity for hydrogen sulphide and organic sulphur compounds with respect to carbon dioxide already gets significantly increased and hence leads to an increased concentration of hydrogen sulphide and organic sulphur compounds in the sour gas.

The selectivity of hydrogen sulphide and organic sulphur compounds with respect to carbon dioxide can be further increased with the help of further low pressure flash stages with compression and return conveying to the second absorption column, so that even for gases used, which have a very unfavourable ratio of hydrogen sulphide and organic sulphur compounds with respect to carbon dioxide, of say 1:40, one can achieve a concentration of hydrogen sulphide and organic sulphur compounds in the sour gas of greater than 50 mol % with this advantageous method.

The desired concentration of sulphur components in the sour gas can further be set through the pressure of the low pressure flash stage, whereby for most cases of application, an advantageous pressure between 3 to 10 bar results, which during re-compressing of the low pressure flash gases leads to significant savings in operational and investment costs, as compared to a conventional two stage absorption.

Further advantages, details and features of the invention can be obtained on the basis of the following description, as well as on the basis of the drawings. The following are shown.

Figure 2:
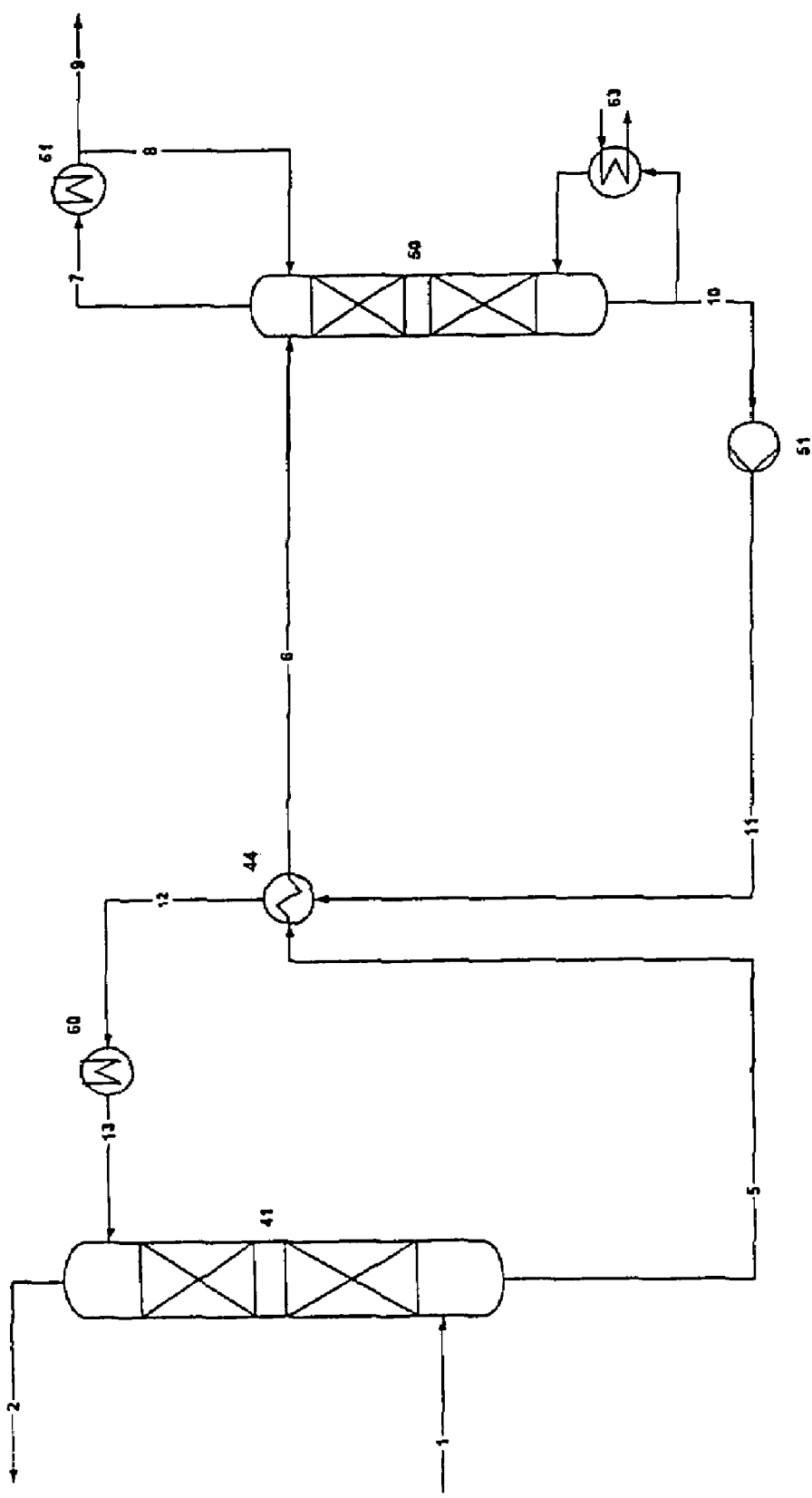

FIG. 1 A plant diagram as per the invention for carrying out the method as per the invention;

FIG. 2 A conventional plant diagram with the same reference signs.

In the diagram, all pipelines and process flows are denoted by the numbers 1 to 30, whereas all plant parts used carry the reference numbers 41 ff.

The pant shown in FIG. 1 initially shows a first absorption column denoted by 41, shown on the left side of the diagram, which is fed with mineral gas or synthesis gas through the pipeline 1, which flows through the absorption column from bottom to top, and leaves at the top as purified gas through a pipeline 2. Thereby the feed gas 1 is guided to the sump of the absorption column. The sour gas components contained in the gas are removed in the counter-flow by the solution 14 released and regenerated in the head of the absorption column 41, whereby the substance exchange element contained in the absorption column takes care of the necessary substance transmission.

The absorption agent (pipeline 3), drawn out of the sump of the absorption column 41 and charged with sour gas, is led to a recycle gas flash container 42, de-stressed there and returned back into the sump of the absorption column 41 in the cycle by means of a recycle gas compressor 43 and the pipeline 4, particularly when one is supposed to regain the gas substances released in the absorption agent like hydrocarbons, hydrogen or carbon monoxide.

In the further stage of the process, the solution leaving the recycle gas flash container 42 is guided to a first heat exchanger 44 through a pipeline 5 and preheated there, then conducted through the pipeline 6 to the additional heat exchanger 46 for further heating, and from there guided to a high pressure flash container 47. The gas phase getting released in the high pressure flash is guided through the pipeline 8 to a cooler 48, while the resulting condensate is guided through the pipelines 11, 24 to the desorption column 50 foreseen in the process; here, for increasing the selectivity for hydrogen sulphide and organic sulphur compounds, apart from the high pressure flash container 47, a low pressure flash container 56 is also built into the pipe line path 20, 25.

The flash gas leaving the cooler 48 out of the pipelines 9 and 23 is fed to the sump of second absorption column 49. In the counter-flow, the absorption agent regenerated as past-flow is fed to the head of the second absorption column 49 through the pipelines 15, 16, 17, which is guided from the sump of the desorption column 50 through the heat exchangers 52 and 54. Through the pipe line 10, pure $CO_2$ leaves the second absorption column 49 at the head as valuable substance. The enriched absorption agent occurring there in the column 49 is released through the pipeline 11 for further increasing the selectivity of hydrogen sulphide and organic sulphur compounds in a flash container 55, whereby the absorption agent is forwarded as part-flow 26 through a heat exchanger 52 and the pipeline 27 to the head of the desorption column 50.

The second part-flow of the absorption agent leaving the desorber 50 is led through the pipeline 12 to the heat exchanger 44, mentioned above, of the solvent flow leaving flash container 42. After passing through the heat exchanger 44, the regenerated absorption agent is passed through the pipe line 13, 14, cooled by the cooler 60 and fed to the bead of the absorption column 41.

Through re-connection of various plant parts as per the invention, the objective of the invention is achieved particularly in a favourable manner, namely by removal of sour gas components with the help of absorption, i.e. the hydrogen sulphides and organic sulphur compounds being treated as effectively as possible, in order to achieve a Claus-gas rich in $H_2S$, which leaves the plant system and is denoted by the arrow 29, whereby simultaneously almost pure $CO_2$ can be obtained as valuable substance. It is thereby possible, as foreseen by the invention, to pre-heat the absorption agent at an increased pressure in the heat exchanger 44 with the help of the hot generated solution 12 coming from the desorption column 50, whereby the pressure value between the pressure of the absorption column 41 and the pressure of the desorption column 50 is adjusted.

FIG. 2 shows a conventional plant diagram for simplifying the following comparison, whereby the same plant parts have the same reference numbers mentioned here. The example described here does not contain any recycle gas flash stage 42 and similarly no recycle gas compressor 43. As example, a gas with a flow quantity of 10000 kmol/hr is taken, having the following composition:

$CO_2$ with 201 kmol/hr., $H_2S$ with 66 kmol/hr., $N_2$ with 15 kmol/hr., $CH_4$ with 29 kmol/hr., $CO_2$ with 3572 kmol/hr., $H_2S$ with 100 kmol/hr. and 17.5 kmol/hr. water vapour. The flows obtained for this example for the method as per the invention are listed in the following table 1;

TABLE

| Gas Quantity | $H_2S$ | $CO_2$ | Temperature | Pressure | Absorption Agent |
|---|---|---|---|---|---|
| Flow Flow-No. | | | | | Volume Flow |

(For figures, see original table)

TABLE 2

Calculated counter-example of a typical absorber/desorber circuit as per FIG. 2

| Gas Quantity | $H_2S$ | $CO_2$ | Temperature | Pressure | Absorption Agent |
|---|---|---|---|---|---|
| Flow Flow-No. | | | | | Volume Flow |

(For figures, see original table)

As one can see from the above table, for a gas which is used having a very unfavourable $H_2S$-to $CO_2$-ratio of 31:46, one can attain a very good Claus-quality of 60% by volume of $H_2S$, so that the Claus-gas can be further processed with a simple standard Claus-plant. As one can see from table 2, which shows a traditional mod, this good quality can be achieved with the help of the method as per invention even though $H_2S$ to $CO_2$-ratio is worse than in the example shown as per the state-of-the-art technology (here 1:36, there 1:26). According to the state-the-aft technology, a per table 2, only a Claus-gas with 33% by volume of $H_2S$ is achieved, which leads to the fact, that the Claus-plant has to be designed in a significantly more complicated manner than in the case of the method as per the invention.

If a gas with a $H_2S$-ratio of 1:36 is used, which is possible in case of this invention, this would yield according to the state-of-the-art technology only a Claus-gas of approx. 22% by volume, which again would lead to further, significant enlargement of the required Claus-plant.

To sum up, one can conclude that the combined effect of the elements mentioned in the claims, like flash boiler 47, 56, second absorption column 49 and, in an extended version, the use of the flash container 55, results in surprisingly high selectivity, which leads to a Claus-gas of approx. 60% by volume of $H_2S$.

Use of the flash container 55, which normally in physical absorption processes serves as so called recycled gas flash container for the purpose of recovering co-absorbing valuable substance components like hydrogen sulphides in mineral gas washes or CO or $H_2$, in case of synthesis gas generation, on account of flashing the run-out flow 18 effects a significant increase in $H_2S$ o/ $CO_2$ selectivity.

I claim:

1. Method for selective removal of hydrogen sulphides, organic sulphur components and $CO_2$ from crude gases, by using a first absorption stage (41) and a second absorption stage (49) for separating almost pure $CO_2$ and using a desorption stage (50) for extracting a gas rich in hydrogen sulphide, whereby the regenerated absorbing substance from the desorption stage (50) is again guided back to both the absorption stages (41, 49), whereby as absorbing substance one uses a chemically non-active solvent, wherein the absorption agent enriched with hydrogen sulphide, organic sulphur compounds and $CO_2$ and coming out of the first absorption stage (41), finds itself at an increased pressure between the pressure of the absorption column (41) and the pressure of the desorption column (50), and is pre-heated with the hot-regenerated solution (12) coming from the desorption stage (50) in a heat exchanger (44), and is then de-stressed at a selected pressure greater than the increased pressure in a high pressure flash container (47), whereby the gas flow released at the increased temperature is cooled in a condenser (48) and then guided to the second absorption stage (40), in which the sulphur components are completely removed with the help of (already mentioned) the part-flow the regenerated absorption agent (15, 16, 17) coming from the desorption stage (50), whereby the absorption agent is guided back (26/27) out of the second absorption stage (49) into the desorption stage (50);

wherein the enriched absorption solution leaving the high pressure flash container (47) is de-stressed in a low pressure (56), whereby the flash gas along with the flash gas coming out of the flash stage (55) is guided to the second absorption column (45) with the help of a common compressor (58), and whereby the absorption solution leaving the low pressure flash (56) is guided on to the head of the desorption column.

2. Method as per claim 1, wherein the charged absorption substance (18) is heated after the second absorption stage (49) and before entering into the desorption stage, whereby the heating takes place in indirect heat exchange (52) with the absorption substance flow (15) coming from the desorption stage.

3. Method as per claim 1, wherein the absorption takes place at an operating pressure of 10 to 150 bar.

4. Method as per claim 1, wherein the temperature of the enriched absorption agent coming from the absorber is increased to 50 to 200° C.

5. Method for selective removal of hydrogen sulphides, organic sulphur components and $CO_2$ from crude gases, by using a first absorption stage (41) and a second absorption stage (49) for separating almost pure $CO_2$ and using a desorption stage (50) for extracting a gas rich in hydrogen sulphide, whereby the regenerated absorbing substance from the desorption stage (50) is again guided back to both the absorption stages (41, 49), whereby as absorbing substance one uses a chemically non-active solvent, wherein the absorption agent enriched with hydrogen sulphide, organic sulphur compounds and $CO_2$ and coming out of the first absorption stage (41), finds itself at an increased pressure between the pressure of the absorption column (41) and the pressure of the desorption column (50), and is pre-heated with the hot-regenerated solution (12) coming from the desorption stage (50) in a heat exchanger (44), and is then de-stressed at a selected pressure greater than the increased pressure in a high pressure flash container (47), whereby the gas flow released at the increased temperature is cooled in a condenser (48) and then guided to the second absorption stage (49), in which the sulphur components are completely removed with the help of (already mentioned) the part-flow the regenerated absorption agent (15, 16, 17) coming from the desorption stage (50), whereby the absorption agent is guided back (26/27) out of the second absorption stage (49) into the desorption stage (50);

wherein directly downstream of the second absorption stage (49) a flash stage (55) is arranged, in which the absorbing substance (18) coming out from the absorption stage (49) is de-stressed and the released gas, which mainly contains hydrogen sulphide, $H_2S$ and carbon dioxide, $CO_2$ is guided back into the second absorption stage (49).

6. Method as per claim 1, wherein after the second absorption stage (49) a flash stage (55) is foreseen, in which the charged absorbing substance is released out of the second absorption stage and the thus released flash gas (19) which primarily contains $CO_2$ and portions of $H_2S$, is led into a pipeline at least indirectly leading to the leading absorption substance stage, and the absorbing substance (26) is guided into the desorption stage.

* * * * *

UNITED STATES PATENT AND TRADEMARK OFFICE
CERTIFICATE OF CORRECTION

| | |
|---|---|
| PATENT NO. | : 7,604,684 B2 |
| APPLICATION NO. | : 10/550251 |
| DATED | : October 20, 2009 |
| INVENTOR(S) | : Johannes Menzel |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1050 days.

Signed and Sealed this

Fifth Day of October, 2010

David J. Kappos
*Director of the United States Patent and Trademark Office*